United States Patent [19]

Peters, Jr. et al.

[11] 3,801,065
[45] Apr. 2, 1974

[54] BALL VALVE
[75] Inventors: Burton Peters, Jr.; Leonard J. Nowak; George J. Nolte, all of Erie, Pa.
[73] Assignee: Burn Industries, Inc., Erie, Pa.
[22] Filed: Jan. 17, 1972
[21] Appl. No.: 218,076

[52] U.S. Cl. ............................................. 251/315
[51] Int. Cl. ............................................. F16k 5/06
[58] Field of Search .......... 251/315, 317, 318, 309, 251/310

[56] References Cited
UNITED STATES PATENTS
| 3,501,128 | 3/1970 | Pool ............................... 251/315 X |
| 3,096,965 | 7/1963 | Margus et al. ................ 251/315 X |
| 3,168,279 | 2/1965 | Anderson et al. .............. 251/315 X |
| 3,185,489 | 5/1965 | Klinger-Lohr ................... 251/315 X |
| 3,567,178 | 3/1971 | Nelson ............................ 251/315 X |

*Primary Examiner*—Samuel Scott

[57] ABSTRACT

A ball valve made up of a body, a ball, and a key. The ball fits snugly in a spherical bore in the body. The ball has a crescent-shaped slot in its top. The bottom of the slot is a curve concentric to the cylindrical bore through the ball, thus the key fits into the slot and the curve of the key is concentric to the cylindrical bore and the bottom of the slot nests in the curve of the key. Therefore, the corners of the key engage a thick part of the ball and this has a minimum tendency to deform the ball when the key is rotated.

1 Claim, 7 Drawing Figures

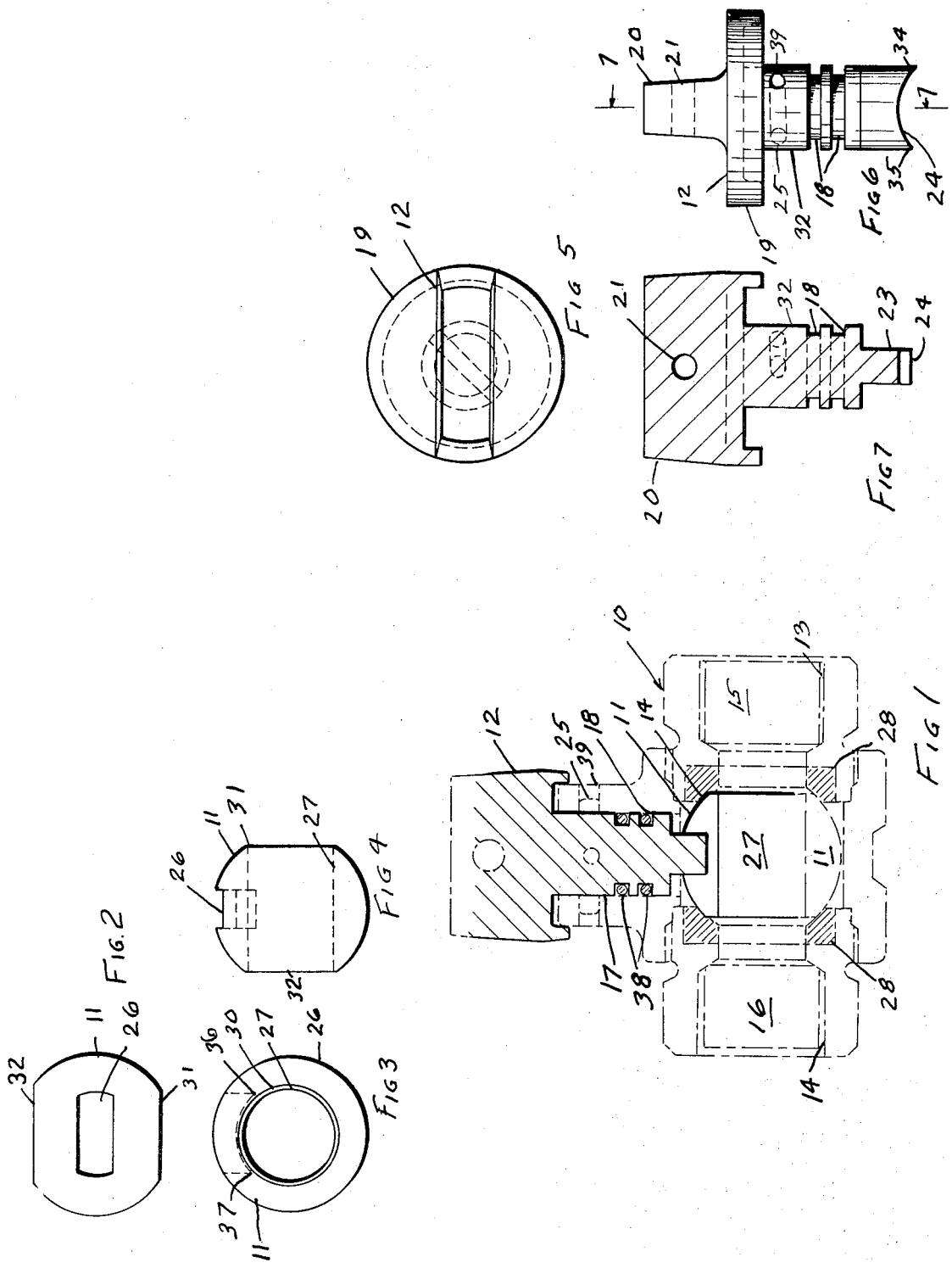

//3,801,065

BALL VALVE

OBJECTS OF THE INVENTION

It is an object of the invention to provide an improved ball valve.

Another object of the invention is to provide an improved combination key and valve ball.

Another object of the invention is to provide a ball valve that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a longitudinal cross sectional view of a valve ball and key according to the invention.
FIG. 2 is a top view of the ball.
FIG. 3 is an end view of the ball.
FIG. 4 is a side view of the ball.
FIG. 5 is a top view of the key.
FIG. 6 is an end view of the key.
FIG. 7 is a longitudinal cross sectional view taken on line 7—7 of FIG. 6.

DETAILED DESCRIPTION OF THE DRAWINGS

Now with more particular reference to the drawings, the valve shown has a body 10 that may be cast of metal or other suitable material or otherwise formed by methods known to those skilled in the art. The body has a ball 11 in it and the ball is connected to a stem 12. The body 10 has ends 15 and 16 that may be threaded or otherwise shaped to be connected to a suitable flow line and provide an inlet and an outlet. The ball has a flow passage extending from end 16 to end 16 and a spherical cavity 14 is formed intermediate the body. The seals 28 are fitted in the ends of the cavity which engage the ball 11. A lateral bore 17 is formed in the body communicating with the spherical cavity and the key 12 is supported in the spherical bore 17. The key has a cylindrical part 32 which fits snugly in the lateral bore 17 and grooves 18 receive O-rings 38 and form a seal against leakage of liquid from the valve. The lateral hole 21 may be formed in the key to receive any suitable tool or the like to rotate the key. Ball 11 may be made of nylon or other suitable material.

The ball has a cylindrical passage 27 through it. The passage may have a cylindrical metallic sleeve insert 30 in it to reinforce the ball. The ends of the ball are flattened off at 31 and 32 in order to conserve the size of the valve body.

The stem has a handle 20 integrally connected to a flange 19 which is in turn integrally connected to the cylindrical part 32 of the valve key. Grooves 18 are formed in the periphery of the key and these grooves receive the O-rings 38 which engage the inside of the bore 17 and form a seal against the leakage of liquid around the valve stem.

An extension 23, which is rectangular in crosssection, is integrally attached to the cylindrical part 32 and the extension 23 has a concave end 24 which is received in the slot 26. The bottom of the slot 26 is in the form of a curve which is concentric to the cylinder 30. The curved surface on the lower end of the key is an intaglio of the bottom of the slot. When the key is in place, the concave surface 24 rests on the bottom of the slot 26, on the outside of the liner 27 so that the corners of the key indicated at 34 and 35 engage the part of the ball indicated at 36 and 37 adjacent the cylindrical bore 27 and, therefore, since this part of the ball is small, do not distort the ball unduly when a torque is put on the handle 20.

The key 25 is disposed in a hole 39 in the body and the key engages a groove in the stem of cylindrical part 32 and prevents the key from being removed from the valve in a manner well known to those skilled in the art.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A ball valve comprising a body, a fluid flow passage through said body, means for attaching said body in a fluid line,
   a spherical seat formed in said body intermediate the ends of said flow passage,
   a lateral bore generally at right angles to said flow passage,
   a round ball made of a material having the properties of nylon disposed in said spherical seat,
   a key in said lateral bore,
   a generally cylindrical hollow metallic insert having a bore disposed diametrically through said ball,
   the ends of said ball being flattened off flush with the ends of said insert,
   a slot in said ball disposed on a radius perpendicular to said cylindrical bore.
   said slot terminating in said ball at the outer periphery of said cylindrical insert,
   said slot having a bottom curved concentric to said cylindrical bore,
   and a key having an end disposed in said slot,
   said key end having a cylindrical shape that is an intaglio of the bottom of said slot,
   said key end being concentric to the flow passage through said valve,
   said key having a cylindrical part integrally attached to said end,
   and said cylindrical part being received in said lateral bore.

* * * * *